US008540577B2

(12) United States Patent
Shvili

(10) Patent No.: US 8,540,577 B2
(45) Date of Patent: Sep. 24, 2013

(54) SYSTEM FOR COMPUTERIZED MULTIPLAYER TOURNAMENT GAMING AND A METHOD THEREOF

(75) Inventor: Omer Shvili, Douglas (IM)

(73) Assignee: Playtech Software Limited, Road Town (VG)

( * ) Notice: Subject to any disclaimer, the term of this patent is extended or adjusted under 35 U.S.C. 154(b) by 783 days.

(21) Appl. No.: 12/472,967

(22) Filed: May 27, 2009

(65) Prior Publication Data

US 2009/0233675 A1 Sep. 17, 2009

Related U.S. Application Data

(63) Continuation-in-part of application No. 11/505,628, filed on Aug. 16, 2006, now Pat. No. 8,360,868.

(51) Int. Cl.
*A63F 13/00* (2006.01)

(52) U.S. Cl.
USPC .............................................. 463/42; 463/25

(58) Field of Classification Search
USPC ......................................... 463/13, 42, 25, 29
See application file for complete search history.

(56) References Cited

U.S. PATENT DOCUMENTS

| | | | |
|---|---|---|---|
| 5,067,724 | A | 11/1991 | Rinkavage |
| 5,259,613 | A | 11/1993 | Marnell, II |
| 5,816,918 | A | 10/1998 | Kelly et al. |
| 6,039,648 | A | 3/2000 | Guinn et al. |
| 6,146,273 | A | 11/2000 | Olsen |
| 6,319,125 | B1 | 11/2001 | Acres |
| 6,755,741 | B1 | 6/2004 | Rafaeli et al. |
| 6,908,390 | B2 | 6/2005 | Nguyen et al. |
| 6,969,320 | B2 | 11/2005 | Lind et al. |
| 7,185,889 | B2 | 3/2007 | VanZanten |
| 7,362,862 | B2 | 4/2008 | Schneier et al. |
| 2001/0004609 | A1 | 6/2001 | Walker et al. |

(Continued)

FOREIGN PATENT DOCUMENTS

EP 1 677 263 A2 7/2006

OTHER PUBLICATIONS

Mar. 8, 2010 Office Action issued in U.S. Appl. No. 11/505,628.
Dec. 19, 2008 Office Action issued in U.S. Appl. No. 11/505,628.

(Continued)

*Primary Examiner* — Arthur O. Hall
*Assistant Examiner* — Allen Chan
(74) *Attorney, Agent, or Firm* — Oliff & Berridge, PLC

(57) ABSTRACT

There are provided a computerized tournament game system and a method of operating of the system. The method includes a) obtaining via the registration interface requests from a plurality of users for registration to a commenced tournament characterized by certain parameters thus giving rise to a plurality of registration requests to the commenced tournament; b) testing, with a help of the computer, if the plurality of registration requests matches a predefined criterion, c) upon matching the predefined criterion, substantially concurrently initiating two or more active tournaments characterized by the same parameters as the commenced tournament; and d) assigning, with a help of the computer, the requests comprised in the plurality of registration requests to the initiated active tournaments in a manner enabling distribution of assignments between all concurrently initiated active tournaments, the assigning provided in accordance with predefined assigning rules. The method may further include updating information related to status of the commenced tournament presented by the registration interface, the information including at least number of players registered to the commenced tournament. The information is provided as average data over the active tournaments corresponding to the commenced tournament.

26 Claims, 3 Drawing Sheets

(56) References Cited

U.S. PATENT DOCUMENTS

| | | | | |
|---|---|---|---|---|
| 2002/0010025 | A1 | 1/2002 | Kelly et al. | |
| 2002/0039923 | A1 | 4/2002 | Cannon et al. | |
| 2002/0123377 | A1 | 9/2002 | Shulman | |
| 2002/0132660 | A1 | 9/2002 | Taylor | |
| 2003/0070178 | A1 | 4/2003 | Boyd et al. | |
| 2003/0186745 | A1 | 10/2003 | Nguyen et al. | |
| 2005/0043094 | A1 | 2/2005 | Nguyen et al. | |
| 2005/0096120 | A1 * | 5/2005 | Lind et al. | 463/19 |
| 2005/0148380 | A1 | 7/2005 | Cannon et al. | |
| 2005/0173862 | A1 | 8/2005 | Orenstein | |
| 2005/0209001 | A1 | 9/2005 | Moshal | |
| 2005/0215300 | A1 * | 9/2005 | Oliveras | 463/13 |
| 2005/0239542 | A1 | 10/2005 | Olsen | |
| 2005/0278041 | A1 * | 12/2005 | Bortnik et al. | 700/91 |
| 2006/0058090 | A1 | 3/2006 | Crawford et al. | |
| 2006/0058092 | A1 | 3/2006 | Crawford et al. | |
| 2006/0068917 | A1 * | 3/2006 | Snoddy et al. | 463/42 |
| 2006/0142076 | A1 * | 6/2006 | Willyard et al. | 463/11 |
| 2006/0148567 | A1 | 7/2006 | Kellerman et al. | |
| 2006/0157934 | A1 | 7/2006 | Yoseloff et al. | |
| 2006/0241795 | A1 | 10/2006 | Weingardt et al. | |
| 2006/0287097 | A1 | 12/2006 | Moshal | |
| 2007/0060317 | A1 | 3/2007 | Martin | |
| 2007/0126186 | A1 * | 6/2007 | Crawford et al. | 273/459 |
| 2007/0191101 | A1 | 8/2007 | Coliz et al. | |
| 2007/0197280 | A1 | 8/2007 | Vali-Tepper | |
| 2008/0045287 | A1 | 2/2008 | Amirsadri et al. | |

OTHER PUBLICATIONS

International Search Report issued in International Application No. PCT/IL2008/001195 on Jan. 14, 2009.

Written Opinion of the International Searching Authority issued in International Application No. PCT/IL2008/001195 on Jan. 14, 2009.

International Search Report issued in International Application No. PCT/IB2007/051625 on Nov. 25, 2008.

Written Opinion of the International Searching Authority issued in International Application No. PCT/IB2007/051625 on Nov. 25, 2008.

International Search Report issued in International Application No. PCT/IB07/53577 on Aug. 29, 2008.

Written Opinion of the International Searching Authority issued in International Application No. PCT/IB07/53577 on Aug. 29, 2008.

Jul. 16, 2009 Office Action issued in U.S. Appl. No. 11/505,628.

Dec. 7, 2010 Office Action issued in U.S. Appl. No. 11/505,628.

Office Action dated Jan. 5, 2012 issued in U.S. Appl. No. 11/505,628.

Apr. 17, 2012 Office Action issued in U.S. Appl. No. 12/676,441.

May 23, 2013 Office Action issued in U.S. Appl. No. 12/676,441.

* cited by examiner

Prior Art

SYSTEM FOR COMPUTERIZED MULTIPLAYER TOURNAMENT GAMING AND A METHOD THEREOF

The present application is a continuation-in-part of U.S. patent application Ser. No. 11/505,628 filed Aug. 16, 2006. The entire contents of this application are hereby incorporated by reference in their entirety.

FIELD OF THE INVENTION

The present invention generally relates to computerized gaming over a communication network, and more particularly to computerized multiplayer tournament gaming.

BACKGROUND OF THE INVENTION

Computerized multiplayer tournaments are well known in prior art. Generally, the players participate in a number of tournaments, each tournament involving one or more instances of a game in which players participate. Depending on the type of game, each instance may involve one or more hands or other wagering events.

For example, in a typical poker game, each player receives a set of cards. Players can either replace some of the cards or hold the cards they receive. The winner of the game is the player holding a set of cards having a predetermined combination of cards determined to be superior to the combinations of other players. There are many variations of poker games such as, by way of non-limiting example, variations in the number of cards used for the game, the number of cards dealt to each player, the rate at which cards are dealt, the rate and number of cards allowed to be changed during a hand, the time in the game when cards are revealed, as well as whether cards are revealed at all, and other variations.

The are also many variations of poker and other tournaments which may differ by criteria for a new tournament start and entry, criteria for starting and ending the tournament, tournament prize calculation and distribution and/or otherwise. The tournament may be scheduled or provided in accordance with a "Sit & Go" approach. Unlike a scheduled tournament, which begins at a set date and time, a "Sit & Go" tournament begins immediately when a number of people registered to the tournament fits a predefined number of participants. For example, a 10-player "Sit & Go" poker tournament will commence once 10 players take their seats at the poker table. "Sit & Go" tournaments are very popular with online gaming rooms, such as but not limited to poker rooms, as the tables fill up rather quickly and players can play these tournaments around the clock.

At the beginning of the tournament a player who registers to play is required to pay a buy-in amount and a fee which goes to the room, and is awarded, accordingly, a certain quantity of tournament chips. The paid buy-in is pooled together with the other players' buy-ins and becomes the prize pool. For example a $5+$0.5 tournament has a $5 buy-in (which means that a 10-player tournament will have a prize pool of $50) and a $0.50 tournament fee (the room will thus earn $5 from such a 10-player tournament).

The room can structure the prizes in many different ways, and the prize pool can be given only to the winner or divided (in different proportions) between the winner and some of the runners up. For example, in popular 10-player "Sit & Go" tournaments the top 3 finishers may be paid.

Computerized multiplayer tournament games may be implemented in various ways known in the art as disclosed, for example, in the following patents and patent applications:

U.S. Pat. No. 6,039,648 (Guinn, et al.) discloses an automated tournament gaming system comprising a central server computer operatively coupled to a plurality of gaming machines for automatically harnessing any of the gaming machines for automatically inciting and running a tournament where a group of players are participating for a period after which prizes are awarded to the winning tournament play participants. In addition, the system includes a host site computer operatively coupled to a plurality of the central servers at a variety of remote gaming sites for providing a multi-site progressive automated tournament gaming system. The multi-site system is integrated into the gaming system to increase the winnings, progressive amounts and the total buy-ins.

U.S. Pat. No. 6,908,390 (Nguen et al.) discloses a gaming system including a number of gaming units and a host computer operatively coupled to the gaming units, and configured to allow a gaming tournament to be conducted. Each of the gaming units may comprise a video display unit, a microphone, a camera, a speaker and a gaming unit controller. The gaming unit controller may be programmed to allow a person to select tournament play as a single or a group tournament player at a reserved or unreserved gaming unit, and to allow player data to be transmitted to the host computer. The host computer may include a host interface unit capable of receiving audio, visual and/or data input from a tournament host during the tournament, and a host computer controller capable of causing host data to be transmitted to the gaming units.

U.S. Pat. No. 7,362,862 (Schneier, et al.) discloses a method and a system for a distributed electronic tournament system in which many remotely located players participate in a tournament through input/output devices connected to a central controller which manages the tournament. The method includes the steps of (a) uniquely identifying a player communicating with the central controller via an associated input/output device; (b) responding to payment of an entry fee by the player for allowing the player to participate in a tournament occurring within a fixed time window via an associated input/output device; (c) accessing a database to store in the database, player information that is generated as the player participates in the tournament, such information being available for use in a subsequent tournament, which is administered by said controller and in which the player participates; and (d) awarding the player a prize for achieving a pre-established performance level in the tournament. In another preferred embodiment, the method further includes the steps of determining whether the player has been qualified to advance to a subsequent game session, in which at least one player is eliminated from the previous game session; and permitting each player qualified to a subsequent game session to participate in that game session.

US Patent Application No. 2002/010025 (Kelly, et al.) discloses a system, method and article of manufacture for determining payment for participating in a network gaming tournament. A plurality of networked game apparatuses are provided for allowing games to be played by a plurality of players in a tournament. An indication of an outcome of at least one game played by each of the players is then received. Based on a sum of the outcomes of the games of all of the players, a total amount of prize credits or prizes is determined. Subsequently, a first portion of the total amount of prize credits or prizes is partitioned for payment for participation in the tournament, and a second portion of the total amount of prize credits or prizes is awarded to at least one winning player based on the outcome of the at least one game thereof.

US Patent Application No. 2005/173862 (Orenstein) discloses a poker tournament for exhibition to an audience, such as a TV audience, conducted by selecting a first number of poker players and conducting a round of poker. The round includes having the selected players play poker with a fixed stake until all but one of the players is eliminated. The round of poker is captured for exhibition, including determining and displaying to an audience the hidden cards of each player. Points are awarded to at least some of said players according to the order in which said players are eliminated. The round of play is repeated for a selected number of rounds with the same players, and a winner is selected according to the total number of points assigned to each player for the selected number of rounds.

US Patent application No. 2006/157934 (Yoseloff, et al.) discloses a method of playing a poker-type card game tournament at multiple sites to determine players in a final tournament. Each multiple site location plays at least a first round of a qualifying event, and an at least second round of advancing players may be used to further narrow the number of players. After playing a predetermined number of hands of the poker-type card game in the first round, at least some players that will advance to an at least second round are determined by the total nominal value or number of chips or tokens accumulated by each player after play of the round. At least one round at a site will determine which players are invited to attend a separate continuing tournament. At least some players are randomly selected for invitation to the separate continuing tournament to complete a field of players, competing in a series of rounds of play to narrow the field to an eventual winner, and awarding a prize to at least the winner.

SUMMARY OF THE INVENTION

In accordance with certain aspects of the invention, there is provided a method of operating a computerized tournament game system comprising a computer operatively coupled to a registration interface, the method comprising: a) obtaining via the registration interface requests from a plurality of users for registration to a commenced tournament characterized by certain parameters thus giving rise to a plurality of registration requests to the commenced tournament; b) testing, with a help of the computer, if said plurality of registration requests matches a predefined criterion, c) upon matching the predefined criterion, substantially concurrently initiating two or more active tournaments characterized by the same parameters as the commenced tournament; and d) assigning, with a help of the computer, the requests comprised in said plurality of registration requests to said initiated active tournaments in a manner enabling distribution of assignments between all concurrently initiated active tournaments, said assigning provided in accordance with predefined assigning rules. The method may further comprise updating information related to status of the commenced tournament presented by the registration interface, said information including at least number of players registered to the commenced tournament, wherein said information is provided as average data over the active tournaments corresponding to the commenced tournament.

In accordance with other aspects of the present invention, there is provided a computerized tournament game system comprising a computer operatively coupled to a registration interface, wherein the registration interface is configured to obtain requests from a plurality of users for registration to a commenced tournament characterized by certain parameters, said requests constituting a plurality of registration requests to the commenced tournament; and the computer is configured to test if said plurality of registration requests matches a predefined criterion, upon matching the predefined criterion, substantially concurrently initiate two or more active tournaments characterized by the same parameters as the commenced tournament; and to assign the requests comprised in said plurality of registration requests to said initiated active tournaments in a manner enabling distribution of assignments between all concurrently initiated active tournaments, said assigning provided in accordance with predefined assigning rules. The computer may be further configured to generate updated information related to status of the commenced tournament, and the registration interface may be further configured to present said information, wherein the information includes at least the number of players registered to the commenced tournament and is generated as average data over the active tournaments corresponding to the commenced tournament.

In accordance with further aspects of the present invention, the predefined criterion may be defined as a threshold number of requests in said plurality of registration requests and/or deviations thereof. The threshold number may be configured as a minimal number of requests in said plurality of registration requests, minimal number of requests from a single casino and/or advertiser, minimal number of different casinos and/or advertisers corresponding to the requests in said plurality of registration requests or otherwise. A number of concurrently initiated active tournaments may be defined as a rounded down result of dividing said threshold number by a minimum number of players required for the tournament.

In accordance with further aspects of the present invention, the predefined assigning rules may be configured to enable assigning a certain request to one or another tournament among the concurrently initiated active tournaments in a random manner. The rules may be further configured to enable assigning the requests to the active tournaments in accordance with an order said requests have been obtained in said plurality of registration requests. Additionally or alternatively, the rules may be configured to enable assigning the requests to the active tournaments in accordance with source IP address associated with a respective request, range of source IP addresses associated with respective request, an advertiser associated with respective request, a casino associated with respective request, personal information related to the client, etc.

In accordance with further aspects of the present invention, the registration interface may be further configured to enable a user to select several options of commenced tournaments with different parameters in order to be registered to any one of them. The computer is further configured to obtain a corresponding multi-option registration request, to append the request to all pluralities of registration requests corresponding to the commenced tournaments selected as options in the multi-option request; to handle the appended request in each of said corresponding pluralities of registration requests upon assigning the request to an active tournament in one of said pluralities; and to disable the appended request in the rest of said corresponding pluralities of registration requests.

In accordance with further aspects of the present invention, at least one of the tournament parameters may be alerted upon assigning the registration requests to the concurrently initiated active tournaments.

In accordance with further aspects of the present invention, the tournament may be configured as a progressive prize tournament characterized by initial tournament parameters (e.g. minimal number of players per tournament, one or more criteria qualifying for winning a progressive prize, initial prize value, rules of adding an ante to the progressive prize, maximal number of tournaments before awarding the progressive prize, maximal time of playing the tournaments before awarding the progressive prize, etc.). At least one of the said initial tournament parameters may be alerted upon winning the progressive prize. For example, altering may be provided if time and/or number of tournaments for winning the prize are less than a predefined minimal value.

BRIEF DESCRIPTION OF THE DRAWINGS

In order to understand the invention and to see how it may be carried out in practice, certain embodiments will now be described, by way of non-limiting example only, with reference to the accompanying drawings, in which.

DETAILED DESCRIPTION OF EXEMPLARY EMBODIMENTS

Figure 1:
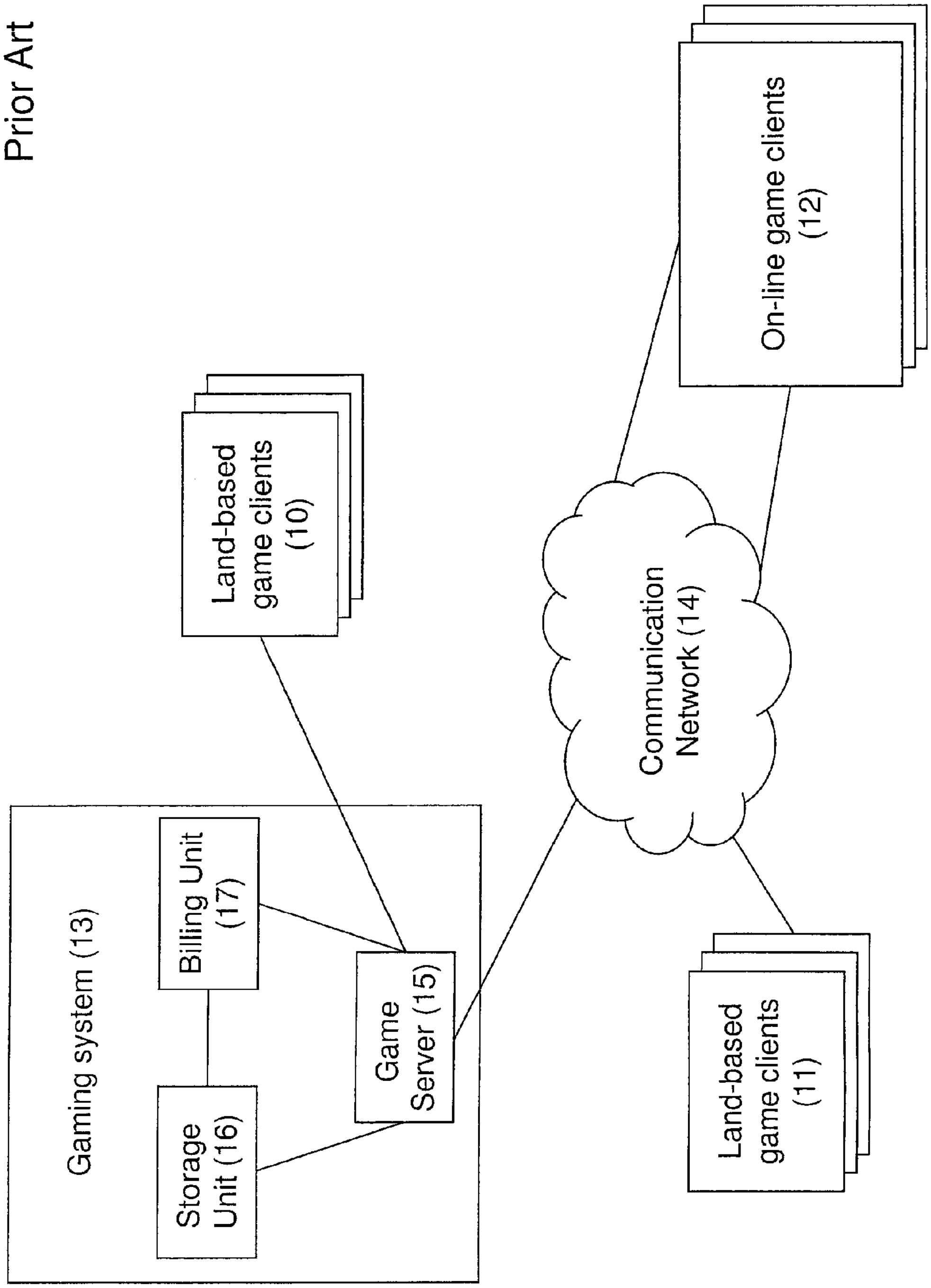
FIG. 1 illustrates a generalized network environment wherein the present invention may be implemented.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and description, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", "generating", "recognizing", "setting", "configuring" or the like, refer to the action and/or processes of a computer that manipulate and/or transform data into other data, said data represented as physical, e.g. such as electronic, quantities and representing the physical objects. The term "computer" should be expansively construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices and combinations thereof.

The operations in accordance with the teachings herein may be performed by a computer specially constructed for the desired purposes or by a general purpose computer specially configured for the desired purpose by a computer program stored in a computer readable storage medium.

In addition, embodiments of the present invention are not described with reference to any particular programming language. It will be appreciated that a variety of programming languages may be used to implement the teachings of the inventions as described herein.

The references cited in the background teach many principles of implementing and managing computerized tournaments that are applicable to the present invention. Therefore the full contents of these publications are incorporated by reference herein where appropriate for appropriate teachings of additional or alternative details, features and/or technical background.

The term "criterion" used in this patent specification should be expansively construed to include any compound criterion, including, for example, several criteria and/or their logical combinations.

Bearing this in mind, attention is drawn to FIG. 1 illustrating a generalized network environment wherein the present invention may be implemented. The illustrated network environment comprises a plurality of land-based game terminals 10, 11 and on-line game clients 12 operatively coupled to a gaming system 13. The land-based game terminals may be connected to the gaming system directly or via a communication network 14 (e.g. Wireline or Wireless Public Telephone Networks, Internet, Intranet, cable network, etc.). The on-line game clients may be associated with any device having input and display capabilities (e.g. personal computer, workstation, PDA, mobile phone, WebTV device, wagering machine, adaptive gaming machine, etc.) and capable to communicate with the game system 13 directly or via communication network 14. Optionally, such a device may further have a video capturing capabilities device and/or audio output capabilities.

The online game clients may be downloaded to the respective device and/or accessed with the help of such a device from the web via a web browser. In certain embodiments of the invention the device shall be also capable to execute at least part of a gaming application. In certain embodiments of the invention the game clients may be associated with land-based gaming terminals 10, 11 and/or with the game system itself (e.g. a game system in a land-based casino may support one or more directly associated clients).

In certain embodiments of the invention there may be provided an exchange of live video/audio inputs between the clients (and/or associated devices) and the game server. A part of the respective display capabilities may be reserved for showing a video image of the other players and/or dealer.

For purpose of illustration only, the following description is made with respect to the online game clients. Those skilled in the art will readily appreciate that the teachings of the present invention are not bound by the online game clients and are applicable in a similar manner to any combination of online clients and land-based terminals operatively coupled to the game system.

The game system 13 comprises a gaming server 15 configured to receive input data from one or more game clients, to execute logic of one or more certain games accordingly, and to report outcome(s) to the game clients in accordance with gaming principles and rules. Server 15 may be configured as a server-side gaming application, wherein each gaming client may be configured to execute the corresponding client-side. The sharing of functions between the game server and the game clients may vary depending on the game and implementation thereof, for example the game client may provide only functions of input/output and/or additionally execute certain programs related to output graphics and/or additionally execute part or all programs related to a game logic and exchange the data with the game server, etc. It will be appreciated that server and/or the clients can alternatively be implemented as firmware ported for a certain processor such as, by way of non-limiting example, digital signal processor (DSP) or microcontrollers, or can be implemented as hardware or configurable hardware such as, by way of non-limiting example, field programmable gate array (FPGA) or application specific integrated circuit (ASIC).

The game system further comprises a storage unit 16 operatively coupled to the game server 15. The storage unit is configured to accommodate all necessary information related to the games and users, including configuration of the game server (e.g. available games, game limits, etc.), users data and profiles, subscription management data and subscriber management (e.g. data related to opening an account for a user, closing an account, allowing a user to add or withdraw funds from an account, changing the user's address or personal identification number, etc.), session histories, detailed game results, monetary transactions, statistical data, etc. By way of non-limiting example, user-related data may include the user's name, address, age, gender, marital status, number of children, salary, occupation, hobbies and preferences or any other personal data. Additionally, user-related data may include data related to the gaming of certain users, for example, number and sums of wagers during the former week, favorite fields of games, sum of money won, bonuses, etc.

The gaming system may comprise other servers (not shown) operatively coupled to the storage unit 16, as, by way of non-limiting example, security server, administration server, live game server and others. The servers are configured to exchange data with the storage unit 16 and/or gaming server 15.

The game system further comprises a billing unit 17 operatively coupled to the game server 15 and the storage unit 16. In certain embodiments of the invention the billing unit may be also operatively coupled to the game clients. The billing unit is configured to accommodate and to manage user accounts and to enable performing of monetary transactions in accordance with data received from the game server, the storage unit and, optionally, the user.

Note that the invention is not bound by the specific architecture described with reference to FIG. 1. Those versed in the art will readily appreciate that the invention is, likewise, applicable to any network architecture facilitating computerized multiplayer tournament gaming. The invention is not bound by the illustrated configuration of the game system; equivalent functionality may be consolidated or divided in another manner. In different embodiments of the invention the functional units and/or parts thereof may be placed in a single or in multiple geographical locations (including duplication for high-availability); operative connections between the units and within the units may be implemented directly or indirectly, including remote connection. The connection may be provided via Wire-line, Wireless, cable, Internet, Intranet, power, satellite or other networks and/or using any communication standard, system and/or protocol and variants or evolution thereof. The invention may also be practiced in distributed computing environments. The gaming system of the present invention may be also fully or partly integrated with different devices, including 3rd party equipment.

Those skilled in the art will also readily appreciate that the storage unit and the data accommodated therein may be divided between different parts of the gaming system in various manners. The accommodated data or part thereof may also be shared with other systems, including 3rd party equipment.

Figure 2:
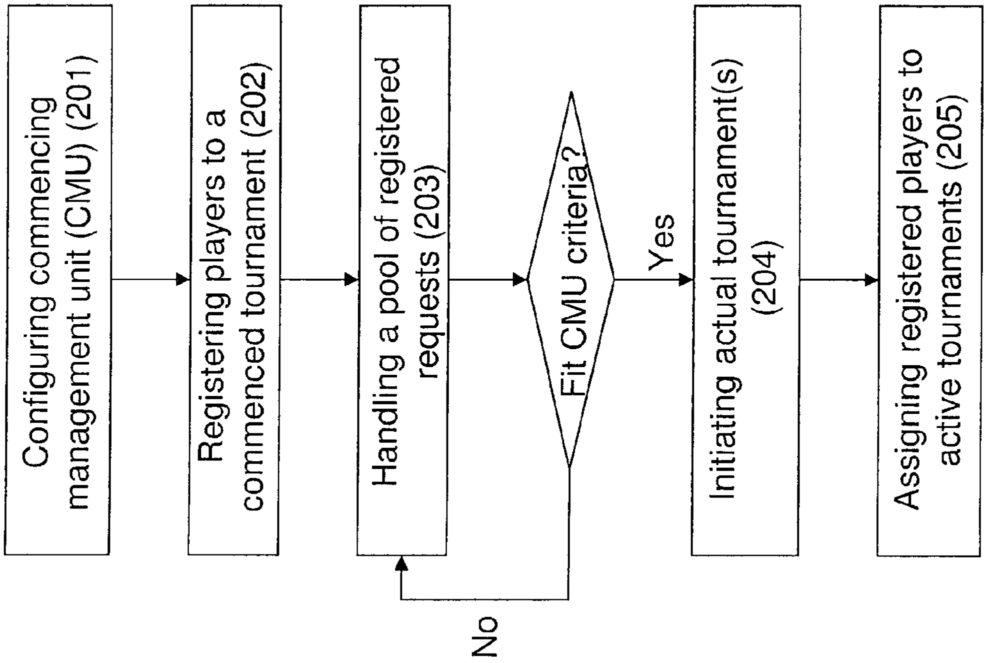
FIG. 2 illustrates a generalized flowchart of a tournament commencing management in accordance with certain embodiments of the present invention.

Referring now to FIG. 2, there is provided a generalized flowchart of a tournament commencing management. In accordance with certain embodiments of the present invention, the game system is configured to enable concurrent registration to at least two "Sit & Go" commencing tournaments as further detailed with reference to FIG. 2.

Registration to a tournament is provided with the help of a commencing management unit (CMU). The CMU and/or parts thereof may be implemented as a block (logical and/or physical) within the game server, within other servers of the game system, or as a stand alone block to be used in conjunction with the game system. The CMU is adapted to facilitate presenting to the players a registration interface for registering (202) to a tournament characterized by certain parameters (e.g. number of players, wagers, prize value, initial value of progressive prize (if any), etc.), said tournament is referred hereinafter as a "commenced tournament". The CMU is further adapted to obtain authorized registration requests generated (in any of suitable ways known in the art) by the game system in response to players' registration requests, recognize requests for registration to a certain commenced tournament, and to handle (203) such requests as a pool corresponding to this certain commenced tournament. Such handling is provided in accordance with CMU configuration and includes testing if the pool of requests matches certain CMU criterion. The testing may be provided in a continuous manner, a scheduled manner, per pre-defined event, etc. Upon matching the criterion, the CMU initiates (204) two or more tournaments (referred hereinafter as "active tournaments") characterized by the same parameters as the commenced tournament, and assigns (205), in accordance with CMU configuration, the registered players to the initiated tournaments. In certain embodiments of the invention the CMU concurrently initiates as many active tournaments as it can fill with players in accordance with requests handled in the pool. The active tournaments are initiated in a manner enabling concurrent assignment of the players registered to the same commenced tournament to all respective concurrently initiated tournaments.

The term "initiating an active tournament" used in this patent specification should be expansively construed to include any action provided by CMU, said action necessary for commencing the active tournament by the gaming system (e.g. informing the game server about matching the CMU criterion, and/or requesting the gaming server for starting the tournament(s), and/or providing the gaming server with approval for starting the tournament(s), etc.).

In certain embodiments of the invention configuring (201) the CMU includes setting the minimal number (optionally, also maximal number) of players per tournament, setting the CMU criterion for initiating the active tournament(s), setting the rules of handling requests in the pool and the rules of assigning the players for active tournaments. By way of non-limiting example, the CMU criterion may be defined as a threshold for the number of requests in the pool. For example, if the threshold is defined as 20, the new tournament(s) are initiated after the number of requests in the pool achieved 20. The number of concurrently initiated active tournaments may be defined as the threshold number divided by the minimum number of players and rounded down (e.g. if the minimal number of players is defined as 6 and the threshold is 20, the number of concurrently initiated tournaments is 3). The players' requests may be assigned to one or another among these active tournaments in a random manner. The pool of requests may be handled as a FIFO (first-in-first-out) queue.

Optionally, the CMU criterion may be configured as depending on different information comprised in the obtained requests (e.g. casinos and/or advertisers associated with the requests, etc.). For example, the threshold may be defined as minimal number of requests from a single casino/advertiser, minimal number of different casino/advertisers corresponding to requests in the pool, etc.

Optionally, assignment algorithm may control (e.g. prevent or limit) assigning among concurrent active tournaments is accordance with different additional criteria and combinations thereof as, for example, IP address, IP range (e.g. corresponding to a playing kiosk), advertiser and/or casino associated with certain request, etc.

Optionally, the pool may be handled as several FIFO queues per different casino/advertiser or other criteria; alternatively, some requests may be provided with higher priority in accordance with different criteria (e.g. VIP player, associated casino, etc.).

The CMU is further adapted to update the tournament status information at the registration interface (e.g. number of players registered to the tournament, number of players to be registered before the start of the tournament, etc.). Although the registration interface is adapted for registration to a commenced tournament, the status information is provided as average data over the active tournaments. For example, the presented number of players registered to the tournament is calculated as a number of requests in the pool multiplied by a minimal number of players, divided by a threshold number, and rounded down (e.g. if there are 18 requests in the pool, minimal number of players is defined as 6 and the threshold is defined as 20, the number of registered players will be presented as 5, and the number of players to be registered before the start of the tournament will be presented as 1).

Optionally, the registration interface may enable the player to select several suitable options of commenced tournaments with different parameters where he/she wants to be registered (e.g. with different buy-in fee, with or without progressive prize, etc.). Accordingly, the CMU unit may be optionally adapted to multiply such multi-options registration request to respective pools, each pool corresponding to one of the selected options, to handle the multiplied requests in each of said pool, and, upon assigning one of said requests to an active tournament, disable the rest of requests in the other pools.

The concurrent registration of players to several active tournaments may be provided as substantially transparent to the players. Among advantages of certain embodiments of such registration in accordance with present invention is preventing collusions between the players. In addition, the disclosed technique may facilitate fair assignment of players to tournaments (which is especially important for small tournaments where the players may learn strong and weak sides of other players during the previous games), enable VIP services (e.g. accelerated registration with multiple options), etc.

Those skilled in the art will readily appreciate that the invention is not bound by the flowchart illustrated in FIG. 2; equivalent functions may be consolidated or divided in another manner, and sequence of some operations may be changed when appropriate.

Figure 3:
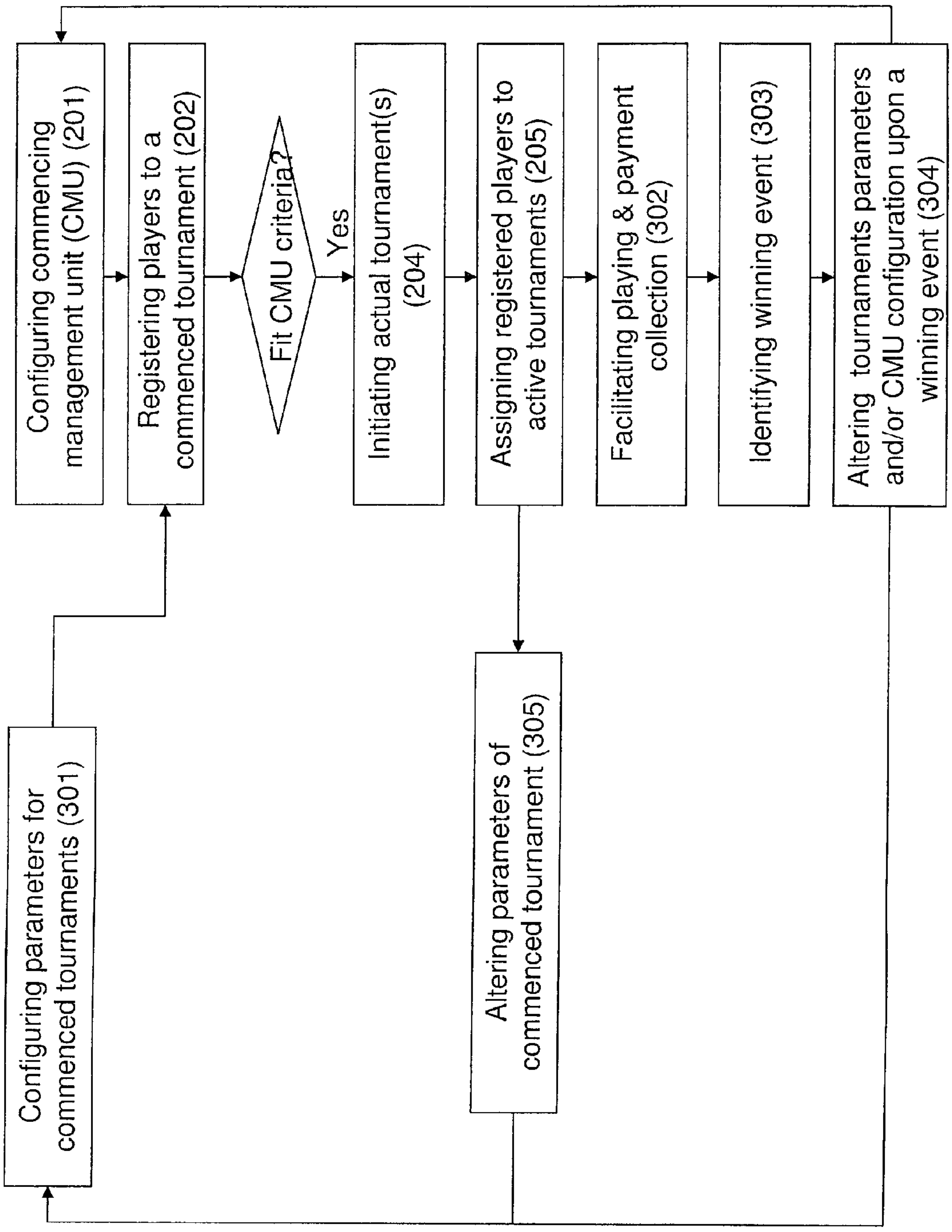
FIG. 3 illustrates a generalized flowchart of operating a tournament with a progressive prize in accordance with certain embodiments of the present invention.

Referring now to FIG. 3, there is provided a generalized flowchart of operating a tournament with a progressive prize in accordance with certain embodiments of the present invention.

The commenced tournament (and corresponding active tournaments) is characterized by tournament parameters which are initially configured (301) before or with the start of operating the game. By way of non-limiting example, the parameters of a progressive prize tournament include a minimal number of players (optionally, also maximal numbers of players), at least one criterion qualifying for winning the progressive prize, initial prize value, and rules of adding an ante to the progressive prize. In certain embodiments of the invention the parameters may include maximal number of tournaments before awarding the progressive prize and/or maximal time of playing the tournaments before awarding the progressive prize. In such embodiments, when at least one of these limits is achieved, the prize is awarded in accordance with certain criteria defined for these circumstances.

The size of a progressive prize keeps growing until someone wins it. In order to win the progressive prize, a player will have to fit winning qualifying criteria. For example, whoever is running the tournament can decide to offer a progressive jackpot prize for players who can win a 10-player "Sit & Go" tournament 5 times in a row. Since the odds of winning one such event are 1:10 (there are 10 players, so each player has a 1 in 10 chance of winning a tournament), the odds of winning 5 tournaments in a row are 1:100,000. If the buy-in fee is \$5+\$0.5, and the room decides to use the entire \$0.50 fee as an ante for the progressive prize (the room may also decide to take an additional fee as an ante for the progressive prize, and/or use a part of the buy-in that was collected), then it is fair to assume that the progressive prize will average \$50,000 when it is won and distributed (calculated as follows 100,000×\$0.5=\$50,000). The room (i.e., whoever is in charge of the tournament) can start the prize fund at a small sum (e.g. \$1,000), and then increase this sum with every tournament that is played, since every tournament that is played will contribute an ante for the progressive prize. In the previous example of a \$5+\$0.50 tournament, where the room chooses to use the \$0.50 as the ante, every tournament that is played will contribute another \$5 to the progressive prize, because 10 players each contributed \$0.50 for the progressive prize.

The winning qualifying criterion may be defined, by way of non-limiting example, as an event of winning a certain number of consecutive tournaments; events belonging to a predetermined percentage of the players having the highest scores, having a minimal value of points or the like.

Upon assigning (205) at least some of registered players to active tournaments, the gaming system facilitates (302) payment collection and playing one or more rounds within the tournament until at least one player meets (303) the qualifying criterion for winning the progressive prize. Upon the winning event, the game system may alter (304) at least one of the initial configured parameters of the commenced tournament (e.g. initial value of progressive prize, minimal number of players, rules of gathering and adding the ante, qualifying criteria, etc.). In this case the non-assigned registered players may be held on the waiting list, and/or get notification about termination of the current tournament, and/or notification of altering some of the parameters together with a request to confirm/cancel the current registration.

Optionally, the gaming system may alter (305) the configuration of the commenced tournament upon assigning (205) at least part of the registered players to the active tournaments.

In certain embodiments of the invention altering may be provided in an automated manner with the help of predefined and/or learning algorithms. By way of non-limiting example, the game system may automatically alter the initial configuration of the commenced tournament if the time of achieving the CMU criterion exceeds a predefined maximal time. In this case altering the parameters may be targeted on improving the tournament's attractiveness. For example, the game system may automatically increase the fee contributed as an ante for the progressive prize (the bigger the ante, the faster the progressive prize will grow), said increase provided in accordance with the time of achieving the CMU criterion. Additionally or alternatively, the game system may automatically introduce a second place prize with an easier-achieved qualifying criterion, etc.

By way of another non-limiting example, the game system may automatically alter the initial configuration of the commenced tournament if the time (and/or number of rounds) for winning the progressive prize is less than a predefined minimal value. In this case altering the parameters may be targeted on reduction of expected value of the next jackpot and/or expenses of the room. Accordingly, the game system may, for example, automatically increase the minimal number of players in the tournament and/or change the qualification criteria in order to increase a degree of difficulty to win, seed amount provided by the house, maximal number of tournaments, maximal time of tournaments, etc.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a computerized tournament game system comprising a computer operatively coupled to a registration interface, the method comprising:

a) obtaining via the registration interface requests from a plurality of users for registration to a commenced tournament characterized by certain parameters thus giving rise to a pool of registration requests to the commenced tournament;

b) testing, with the computer, if the pool of registration requests matches a predefined criterion related to the pool;

c) upon matching the predefined criterion related to the pool, substantially concurrently initiating two or more active tournaments characterized by the same parameters as the commenced tournament;

d) assigning, with the computer, the requests comprised in the pool of registration requests to the initiated active tournaments in a manner enabling distribution of assignments between all respective concurrently initiated active tournaments, the assigning provided in accordance with predefined assigning rules, thereby providing distribution of the requests for registration to the commenced tournament between the initiated active tournaments for actual gaming; and e) updating information related to status of the commenced tournament presented by the registration interface, the information including at least the number of players registered to the commenced tournament, wherein the information is provided as average data over the active tournaments corresponding to the commenced tournament.

2. The method of claim 1 wherein the pool of registration requests to a certain commenced tournament is generated upon recognizing requests for registration to the tournament, the requests being recognized among requests for registration to different commenced tournaments.

3. The method of claim 1 wherein the testing is provided in at least one mode selected from a group comprising continuous testing, scheduled testing and testing in accordance with one or more pre-defined events.

4. The method of claim 1 wherein the predefined criterion is defined as a threshold number of requests in the pool of registration requests and/or deviations thereof.

5. The method of claim 4 wherein the threshold number is selected from a group comprising a minimal number of requests in the pool of registration requests, minimal number of requests from a single casino and/or advertiser, minimal number of different casinos and/or advertisers corresponding to the requests in the pool of registration requests.

6. The method of claim 4 wherein a number of concurrently initiated active tournaments is defined as a rounded down result of dividing the threshold number by a minimum number of players required for the tournament.

7. The method of claim 1 wherein the predefined assigning rules are configured to enable assigning a certain request to one or another tournament among the concurrently initiated active tournaments in a random manner.

8. The method of claim 1 wherein the predefined assigning rules are configured to enable assigning the requests to the active tournaments in accordance with an order that the requests have been obtained in the pool of registration requests.

9. The method of claim 1 wherein the predefined assigning rules are configured to enable assigning the requests to the active tournaments in accordance with at least one characteristic of the requests selected from a group comprising: source IP address associated with the respective request, range of source IP addresses associated with the respective request, an advertiser associated with the respective request, a casino associated with the respective request.

10. The method of claim 1 wherein the registration interface is further configured to enable a user to select several options of commenced tournaments with different parameters in order to be registered to any one of them, thus giving rise to a multi-option registration request; the method further comprising:

a) obtaining via the registration interface a multi-option registration request;

b) appending the request to all pluralities of registration requests corresponding to the commenced tournaments selected as options in the multi-option request;

c) handling the appended request in each of the corresponding pluralities of registration requests upon assigning the request to an active tournament in one of the pluralities; and d) disabling the appended request in the rest of the corresponding pluralities of registration requests.

11. The method of claim 1 further comprising altering at least one of the tournament parameters upon assigning the registration requests to the concurrently initiated active tournaments.

12. The method of claim 11 wherein altering is provided if a time of achieving the threshold number exceeds a predefined maximal time.

13. The method of claim 1 wherein the tournament is configured as a progressive prize tournament characterized by initial tournament parameters, wherein at least one of the initial tournament parameters is selected from a group comprising: minimal number of players per tournament, one or more criteria qualifying for winning a progressive prize, initial prize value, rules of adding an ante to the progressive prize, maximal number of tournaments before awarding the progressive prize, maximal time of playing the tournaments before awarding the progressive prize.

14. The method of claim 13 further comprising altering at least the one of the initial tournament parameters, wherein altering is provided if a time and/or number of tournaments for winning a prize is less than a predefined minimal value.

15. The method of claim 13 further comprising altering at least the one of the initial tournament parameters, wherein altering is provided if a time of achieving the threshold number for assigning the registration requests exceeds a predefined maximal time.

16. A computerized tournament game system comprising a computer operatively coupled to a registration interface, wherein:

a) the registration interface is configured to obtain requests from a plurality of users for registration to a commenced tournament characterized by certain parameters, the requests constituting a pool of registration requests to the commenced tournament;

b) the computer is configured i) to test if the pool of registration requests matches a predefined related to the pool, ii) upon matching the predefined criterion related to the pool, substantially concurrently initiate two or more active tournaments characterized by the same parameters as the commenced tournament;

iii) to assign the requests comprised in the pool of registration requests to the initiated active tournaments in a manner enabling distribution of assignments between all concurrently initiated active tournaments, the assigning provided in accordance with predefined assigning rules, thereby providing distribution of the requests for registration to the commenced tournament between the initiated active tournaments for actual gaming; and iv) updating information related to status of the commenced tournament presented by the registration interface, the information including at least the number of players registered to the commenced tournament, wherein the information is provided as average data over the active tournaments corresponding to the commenced tournament.

17. The system of claim 16 wherein the computer is configured to generate updated information related to status of the commenced tournament, and the registration interface is configured to present the information, wherein the information includes at least number of players registered to the commenced tournament and is generated as average data over the active tournaments corresponding to the commenced tournament.

18. The system of claim 16 wherein the predefined criterion is defined as a threshold number of requests in the pool of registration requests and/or deviations thereof.

19. The system of claim 18 wherein the threshold number is selected from a group comprising a minimal number of requests in the pool of registration requests, minimal number of requests from a single casino and/or advertiser, minimal number of different casinos and/or advertisers corresponding to the requests in the pool of registration requests.

20. The system of claim 18 wherein a number of concurrently initiated active tournaments is defined as a rounded down result of dividing the threshold number by a minimum number of players required for the tournament.

21. The system of claim 16 wherein the predefined assigning rules are configured to enable assigning a certain request to one or another tournament among the concurrently initiated active tournaments in a random manner.

22. The system of claim 16 wherein the predefined assigning rules are configured to enable assigning the requests to the active tournaments in accordance with an order the requests have been obtained in the pool of registration requests.

23. The system of claim 16 wherein the predefined assigning rules are configured to enable assigning the requests to the active tournaments in accordance with at least one characteristic of the requests selected from a group comprising: source IP address associated with the respective request, range of source IP addresses associated with the respective request, an advertiser associated with the respective request, and a casino associated with the respective request.

24. The system of claim 16 wherein the registration interface is further configured to enable a user to select several options of commenced tournaments with different parameters in order to be registered to any one of them, thus giving rise to a multi-option registration request; and the computer is further configured:

a) to obtain via the registration interface the multi-option registration request;

b) to append the request to all pluralities of registration requests corresponding to the commenced tournaments selected as options in the multi-option request;

c) to handle the appended request in each of the corresponding pluralities of registration requests upon assigning the request to an active tournament in one of the pluralities; and d) to disable the appended request in the rest of the corresponding pluralities of registration requests.

25. A non-transitory program storage device readable by machine, tangibly embodying a program of instructions executable by the machine to perform a method of operating a computerized tournament game system, the method comprising:

a) obtaining requests from a plurality of users for registration to a commenced tournament characterized by certain parameters thus giving rise to a pool of registration requests to the commenced tournament;

b) testing if the pool of registration requests matches a predefined criterion, c) upon matching the predefined criterion related to the pool, substantially concurrently initiating two or more active tournaments characterized by the same parameters as the commenced tournament;

d) assigning the requests comprised in the pool of registration requests to the initiated active tournaments in a manner enabling distribution of assignments between all concurrently initiated active tournaments, the assigning provided in accordance with predefined assigning rules, thereby providing distribution of the requests for registration to the commenced tournament between the initiated active tournaments for actual gaming; and e) updating information related to status of the commenced tournament presented by the registration interface, the information including at least the number of players registered to the commenced tournament, wherein the information is provided as average data over the active tournaments corresponding to the commenced tournament.

26. A computer program product comprising a computer useable non-transitory physical medium having computer readable program code embodied therein of operating a computerized tournament game system, the computer program product comprising:

a) computer readable program code for causing the computer to obtain requests from a plurality of users for registration to a commenced tournament characterized by certain parameters thus giving rise to a pool of registration requests to the commenced tournament;

b) computer readable program code for causing the computer to test if the pool of registration requests matches a predefined criterion related to the pool, c) computer readable program code for causing the computer to substantially concurrently initiate, upon matching the predefined criterion related to the pool, two or more active tournaments characterized by the same parameters as the commenced tournament;

d) computer readable program code for causing the computer to assign the requests comprised in the pool of registration requests to the initiated active tournaments in a manner enabling distribution of assignments between all concurrently initiated active tournaments, the assigning provided in accordance with predefined assigning rules, thereby providing distribution of the requests for registration to the commenced tournament between the initiated active tournaments for actual gaming; and e) updating information related to status of the commenced tournament presented by the registration interface, the information including at least the number of players registered to the commenced tournament, wherein the information is provided as average data over the active tournaments corresponding to the commenced tournament.

* * * * *